(12) United States Patent
Ludusan (10) Patent No.: US 10,061,383 B1
(45) Date of Patent: Aug. 28, 2018

(54) MULTI-FEATURE GAZE TRACKING SYSTEM AND METHOD

(71) Applicant: Mirametrix Inc., Montreal (CA)

(72) Inventor: Cosmin Vasile Ludusan, Verdun (CA)

(73) Assignee: Mirametrix Inc., Montreal (CA)

( * ) Notice: Subject to any disclaimer, the term of this patent is extended or adjusted under 35 U.S.C. 154(b) by 0 days.

(21) Appl. No.: 15/268,129

(22) Filed: Sep. 16, 2016

Related U.S. Application Data

(60) Provisional application No. 62/219,413, filed on Sep. 16, 2015.

(51) Int. Cl.
*G06F 3/01* (2006.01)
*G06T 7/00* (2017.01)
(Continued)

(52) U.S. Cl.
CPC .............. *G06F 3/013* (2013.01); *G06F 3/012* (2013.01); *G06F 3/1423* (2013.01);
(Continued)

(58) Field of Classification Search
CPC ........ G06F 3/013; G06F 3/012; G06F 3/1423; G06F 3/04815; G06K 9/00597; G06K 9/00604; G06K 9/0061; G06T 3/4015; G06T 7/0012; G06T 7/0044; G06T 7/0046; G06T 2207/10012; G06T 2207/10048; G06T 2207/10152; G06T 2207/30041; G06T 2207/30201; G02B 27/0093
See application file for complete search history.

(56) References Cited

U.S. PATENT DOCUMENTS

| 4,950,069 A * | 8/1990 | Hutchinson ............ A61B 3/113 351/210 |
| 5,912,721 A * | 6/1999 | Yamaguchi ............ A61B 3/113 351/209 |

(Continued)

FOREIGN PATENT DOCUMENTS

WO 2014/146199 A1 9/2014

OTHER PUBLICATIONS

Ebisawa, Y.; "Improved video-based eye-gaze detection method"; IEEE Transactions on Instrumentation and Measurement; 47(4); pp. 948-955; Aug. 1998.

(Continued)

*Primary Examiner* — Tom Sheng
(74) *Attorney, Agent, or Firm* — Brett J. Slaney; Blake, Cassels & Graydon LLP (57) ABSTRACT

A method is provided for determining a point of gaze directed at a graphical display. The method comprises: a) acquiring an image of at least one eye of a user containing at least one gaze aspect and at least one reference aspect; b) extracting image aspects from the image, the image aspects comprising a set of reference aspects and a set of gaze aspects corresponding to the image; c) extracting a set of features for each of said image aspects; d) computing a set of feature vectors between said set of gaze aspects and said set of reference aspects; e) computing a point of gaze for each of said set of feature vectors, using a predefined mathematical relationship; and f) using a predefined rule to combine the computed points of gaze into a final point of gaze on the graphical display.

28 Claims, 10 Drawing Sheets

(51) Int. Cl.
*G06T 3/40* (2006.01)
*G06F 3/14* (2006.01)
*G06K 9/00* (2006.01)

(52) U.S. Cl.
CPC ....... *G06K 9/0061* (2013.01); *G06K 9/00604* (2013.01); *G06T 3/4015* (2013.01); *G06T 7/0044* (2013.01); *G06T 7/0046* (2013.01); *G06T 2207/10012* (2013.01); *G06T 2207/10048* (2013.01); *G06T 2207/10152* (2013.01); *G06T 2207/30201* (2013.01)

(56) References Cited

U.S. PATENT DOCUMENTS

| | | | | |
|---|---|---|---|---|
| 6,243,076 | B1* | 6/2001 | Hatfield | G06F 3/013 345/156 |
| 7,306,337 | B2* | 12/2007 | Ji | G06F 3/013 351/209 |
| 7,572,008 | B2 | 8/2009 | Elvesjo et al. | |
| 7,653,213 | B2 | 1/2010 | Longhurst et al. | |
| 7,832,866 | B2* | 11/2010 | Chao | A61B 3/113 351/209 |
| 8,135,173 | B2* | 3/2012 | Chao | A61B 3/113 351/209 |
| 8,339,446 | B2 | 12/2012 | Blixt et al. | |
| 8,457,352 | B2* | 6/2013 | Hennessey | A61B 3/113 382/103 |
| 8,487,838 | B2* | 7/2013 | Lewis | A61B 3/113 345/8 |
| D722,315 | S | 2/2015 | Liang et al. | |
| 9,194,952 | B2* | 11/2015 | Blixt | A61B 3/113 |
| 9,237,844 | B2* | 1/2016 | De Bruijn | A61B 3/113 |
| 9,329,683 | B2* | 5/2016 | Ebisawa | A61B 3/113 |
| 9,495,589 | B2* | 11/2016 | Strombom | A61B 3/113 |
| 9,733,703 | B2* | 8/2017 | Sullivan | G06F 3/013 |
| 2003/0098954 | A1* | 5/2003 | Amir | A61B 3/113 351/210 |
| 2005/0175218 | A1* | 8/2005 | Vertegaal | A61B 3/113 382/103 |
| 2009/0304232 | A1* | 12/2009 | Tsukizawa | A61B 3/113 382/103 |
| 2014/0111632 | A1* | 4/2014 | Huang | G06K 9/00604 348/78 |
| 2015/0192992 | A1* | 7/2015 | Di Censo | G02B 27/01 345/156 |
| 2016/0063303 | A1* | 3/2016 | Cheung | A61B 3/113 382/103 |

OTHER PUBLICATIONS

Grabner, H. et al.; "Tracking the invisible: Learning where the object might be"; IEEE Conference on Computer Vision and Pattern Recognition (CVPR); pp. 1285-1292; Jun. 2010.

Ji, Q. and Yang, X.; "Real-time eye, gaze, and face pose tracking for monitoring driver vigilance"; Real-Time Imaging; 8(5); pp. 357-377; Oct. 2002.

Merchant, J. et al.; "Remote measurement of eye direction allowing subject motion over one cubic foot of space"; IEEE Transactions on Biomedical Engineering; BME-21(4); pp. 309-317; Jul. 1974.

Morimoto, C. et al.; "Pupil detection and tracking using multiple light sources"; Technical Report RJ-10117; IBM US Research Centers (Yorktown, San Jose, Almaden, US); Yorktown Heights; 1998.

Ohno, T. et al.; "FreeGaze: A gaze tracking system for everyday gaze interaction"; Proceedings of the Symposium on Eye Tracking Research & Applications (ETRA); pp. 125-132; Mar. 2002.

Sesma, L. et al.; "Evaluation of pupil center-eye corner vector for gaze estimation using a web cam"; Proceedings of the Symposium on Eye Tracking Research & Applications (ETRA); pp. 217-220; Mar. 2012.

Bengoechea, J. J. et al.; "Evaluation of accurate eye corner detection methods for gaze estimation"; International Workshop on Pervasive Eye Tracking Mobile Eye-Based Interaction; 2013.

George, A. et al.; "Fast and Accurate Algorithm for Eye Localisation for Gaze Tracking in Low Resolution Images"; IET Computer Vision; vol. 10, No. 7; 2016; pp. 660 to 669.

Skodras, E. et al.; "On Visual Gaze Tracking Based on a Single Low Cost Camera"; Signal Processing: Image Communication; vol. 36; 2015; pp. 29 to 42.

* cited by examiner

MULTI-FEATURE GAZE TRACKING SYSTEM AND METHOD

CROSS-REFERENCE TO RELATED APPLICATION(S)

This application claims priority to U.S. Provisional Application No. 62/219,413 filed on Sep. 16, 2015, the contents of which are incorporated herein by reference.

FIELD OF THE INVENTION

The following relates to systems and methods for gaze tracking, in particular using multiple features.

BACKGROUND

Ever since the first commercially-viable gaze tracking solution [1] in 1974, the challenge for all subsequent systems has been to provide high gaze tracking accuracy with low hardware complexity. Present day commercial systems trade-off low hardware complexity in favor of high gaze tracking accuracy and consequently tend to be complex, expensive and restrictive in terms of hardware integration.

In order to ensure gaze tracking accuracy and system robustness, the solution disclosed in [2] uses both on-axis (or bright pupil response) and off-axis (or dark pupil response) infrared (IR) illumination (active IR). This translates to increased hardware complexity and power consumption, as well as system miniaturization limitations.

A similar approach, disclosed in [3] by Tobii Technology Ab, includes a single camera system, using both on-axis and off-axis IR illumination. Another solution disclosed by Tobii Technology Ab [4], relies on the same on-axis-off-axis IR illumination setup and a dual-camera system. Another gaze tracking system along the same lines is the one disclosed by Seeing Machines Pty Ltd [5], including a stereo-camera setup embodiment, the second camera being optional. Utechzone Co. Ltd disclosed in [6] and [7] two single-camera, off-axis IR illumination solutions that follow the same, aforementioned, trade-off. Similar methods were also disclosed over the years in the scientific literature, e.g., [8], [9], [10], all relying on the active IR, on/off-axis illumination paradigm.

The accuracy and robustness requirements for a commercially-viable system and method have steered the current gaze tracking paradigm towards the following characteristics:
  active IR, to simplify the image acquisition process and allow for a glint-based Point-of-Gaze (PoG) computation;
  a PoG computation on a graphical display, requiring an initial calibration step and a Pupil Center Corneal Reflection (PCCR) vector to map the PoG from the image coordinate system to a reference coordinate system;
  on-axis and off-axis illumination for pupil extraction robustness and dual glint availability for depth and perspective correction; and
  below the graphical display surface positioning to maximize the availability of the glint for detection and extraction.

All of these solutions are done in order to guarantee an angular accuracy of the estimated PoG within the current industry standards regardless of external constraints such as frame rate, user variability, illumination conditions, effective range, etc.

If the main requirement is low-complexity hardware and system specifications, the current trade-off is the system's gaze tracking accuracy and robustness, e.g., [11]. The gain in this case is hardware simplicity, device size and spatial positioning. The reported gaze tracking angular accuracy of the system disclosed in [11] has been found to be between three to six times worse than the current industry standard.

The trade-off between hardware complexity and gaze tracking accuracy has so far made commercially available gaze tracking systems impractical for physical integration within computing devices. Due to the positioning restrictions, i.e., at the bottom of the graphical display, the use of these systems is either as stand-alone, external devices or as impractical integrated solutions, e.g., [12]. Their integration typically requires a major redesign of the computing device, process which is both non-trivial and production-cost-ineffective.

SUMMARY

The following provides a system and method for gaze tracking, e.g. eye tracking that includes determining the eye position, blink states, and gaze point in relation to a display. The principles described herein can also be applied to head pose tracking. The system allows for seamless integration with laptop, all-in-one personal computers, tablet computers, and smartphones, among other personal electronic/computing devices.

In one aspect, there is provided a method for determining a point of gaze directed at a graphical display, comprising: a) acquiring an image of at least one eye of a user containing at least one gaze aspect and at least one reference aspect; b) extracting image aspects from the image, the image aspects comprising a set of reference aspects and a set of gaze aspects corresponding to the image; c) extracting a set of features for each of said image aspects; d) computing a set of feature vectors between said set of gaze aspects and said set of reference aspects; e) computing a point of gaze for each of said set of feature vectors, using a predefined mathematical relationship or model; and f) using a predefined rule to combine the computed points of gaze into a final point of gaze on the graphical display.

In another aspect, there is provided a system adapted to be coupled to at least one image acquisition module and a graphical display, comprising: a) an interface for acquiring at least one image of at least one eye of a user captured by the image acquisition module while the user is gazing at the graphical display and while at least one illumination source is emitting light towards the at least one eye of the user; b) an illumination controller for controlling said at least one illumination source; and c) a processor configured for performing at least one of power and data management, and configured for performing the above-noted method.

BRIEF DESCRIPTION OF THE DRAWINGS

Embodiments will now be described by way of example only with reference to the appended drawings wherein.

DETAILED DESCRIPTION

While the existing low-complexity hardware systems used as a proof of concept fall short of delivering a gaze tracking angular accuracy within industry standards, the commercial systems are found to be complex, expensive and hard to embed in consumer devices. A gaze tracking system and method that solves this trade-off and provides industry standard gaze tracking accuracy within a low-complexity hardware configuration would make gaze tracking systems affordable, reliable and mass market available, as part of consumer devices.

The systems and methods described herein solve the current technological trade-off by employing:

a new gaze tracking system—low-complexity, miniaturized optical stack and supporting hardware with no positioning constraints with respect to the graphical display;

a method to support this new gaze tracking system, which accounts for the set of technical challenges introduced by the new system, i.e., low-complexity hardware, above the graphical display positioning, miniaturization; all this while being capable to provide industry standard gaze tracking accuracy and robustness.

The system includes, in at least one implementation, an on-axis IR illumination source, as disclosed in [13], and an optical system capable of acquiring a real-time, continuous stream of IR illuminated images. The optical system and on-axis IR illumination source are small enough to make the physical footprint of the gaze tracking system suitable for integration in consumer electronics, e.g., laptop, desktop, all-in-one computers, tablets, smartphones, etc. The system integration requires minimal design changes since its footprint is similar to a standard web camera module. The reduced physical footprint of the system allows for a flexible positioning, e.g., above the graphical display area, analogous to a web camera. The industry standard gaze tracking accuracy and robustness requirements are ensured by using an active IR illumination in conjunction with a multi-feature-based PoG estimation.

The flexible positioning of the optical system and on-axis IR illuminators introduces additional challenges, in particular, the occlusion of the glint (reference point) by the upper eyelid. Gaze tracking robustness is achieved by replacing the PCCR-based PoG estimation with a multi-feature one, which relies on a plurality of reference aspects to complement the glint and ensure a PoG estimation even when the glint is not detectable. The method utilized by the system includes, in at least one implementation, the following computer executable steps: (i) read the input frame, (ii) pre-process the input frame, (iii) extract the gaze aspects and reference aspects, (iv) normalize the extracted gaze aspects and reference aspects, (v) compute the characteristic features of the extracted gaze aspects and reference aspects, (vi) compute the feature vectors between the gaze aspects and reference aspects and map them from the feature vector space to the graphical display space, (vii) with the mapped feature vectors, compute the PoG associated to each vector, and (viii) combine the resulting PoG estimates to produce a singular, output PoG.

In one embodiment, the system includes on-axis IR illumination sources and an optical system. The method that processes the image data received from the system can be the one previously described. The multi-feature gaze tracking method, in this embodiment, utilizes the glint and the eye corners as the reference aspects. Based on these reference aspects, the feature vectors and the associated PoG estimates are computed.

In another embodiment, the method incorporates an extended set of reference aspects, including, but not limited to: nose tip, nostrils, corners of the mouth, bridge of the nose, etc. An additional computational step is included in the method of this embodiment, to account for the mapping of the extracted reference aspects from the user 3D space to the 2D image space.

In yet another embodiment, the system is configured to also include off-axis IR illumination sources. The distinction of this embodiment from the standard on-axis-off-axis paradigm is that the off-axis illumination sources are used only to produce a second glint (off-axis glint), projected on the bottom part of the eye, when the main glint (on-axis glint) is not detected. The image data processing remains the same, i.e., bright pupil response, the images where the off-axis IR illumination source is ON are processed with their color space inverted. The multi-feature gaze tracking system and method refer in this case to the described system and the two glints as the two reference aspects necessary for computing the feature vectors and associated PoGs.

In yet another embodiment the system includes both on-axis and off-axis illumination sources, as previously described and the method extracts and processes additional reference aspects as part of the multi-feature gaze estimation method. The reference aspects used by the multi-feature gaze estimation method are the ones previously mentioned, e.g., eye corners, mouth corners, tip of the nose, nostrils.

The systems and methods described herein are unique when compared to known systems and methods for at least the following reasons: (a) they can provide the same PoG estimation accuracy as the current industry standard while, (b) employing an on-axis-only IR illumination source and an optical image acquisition system. In its basic embodiment the system can be configured to be small enough to allow embedding in consumer electronics devices, e.g., laptop, all-in-one, tablet computers or smartphones with minimal redesign requirements.

The systems and methods described herein are also novel when compared to existing solutions because they can successfully solve the current industry trade-off by: (a) using an active IR, multi-feature-based PoG computation to ensure a PoG estimation angular accuracy within current industry standards, and (b) even when mounted above the display surface and in the presence of glint occlusion.

The following also describes a solution that provides a device that is more economical to produce, easier to manufacture, easier to repair and more durable. Further still, a device that is smaller and more lightweight than other solutions can be provided, thereby enabling the device to be more easily portable.

The systems and methods will be described more fully hereinafter with reference to the accompanying drawings, which are intended to be read in conjunction with both this summary, the detailed description and any preferred and/or particular embodiments specifically discussed or otherwise disclosed. These systems and methods may, however, be embodied in many different forms and should not be construed as limited to the embodiments set forth herein; rather, these embodiments are provided by way of illustration only and so that this disclosure will be thorough, complete and will fully convey the full scope of the claims appended hereto.

Turning now to the figures, a complete gaze tracking solution is disclosed. The solution comprises a system and the associated method describing gaze tracking algorithms that can be used thereby. The computer system 1A or 1B, illustrated in FIG. 1, includes: a display area 103, infrared (IR) light sources 102 and an imaging sensor 101.

Figure 1:
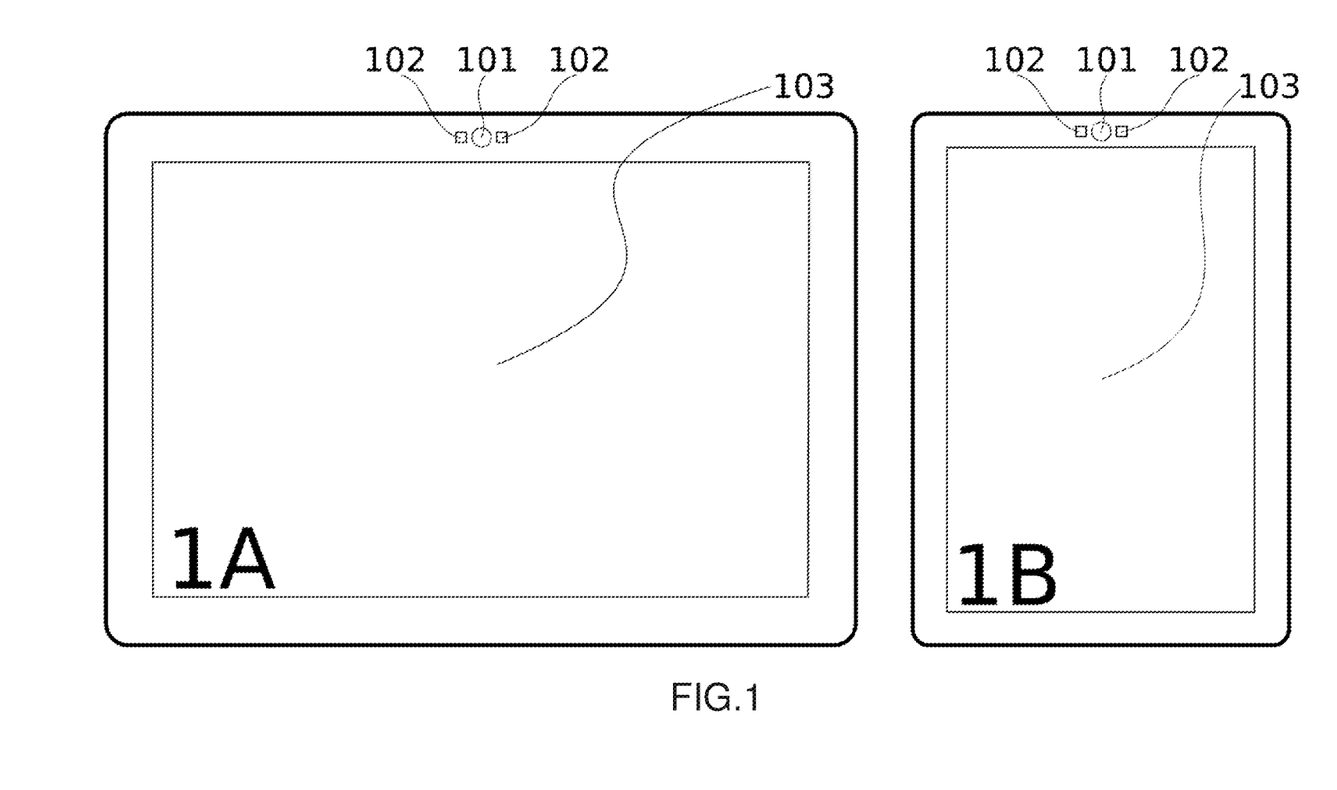
FIG. 1 illustrates the an example of a configuration for a gaze tracking system.

The computer system 1A or 1B, can embody the following devices, without limitation: laptop computer, all-in-one computer, desktop computer display, tablet and smartphone. The example computer systems 1A, 1B is set up to use only on-axis (bright pupil response) IR illumination, as disclosed in [13].

Regarding FIG. 1, which illustrates a basic embodiment of the system, included are the on-axis IR illumination sources 102 and the optical system 101. In an advantageous implementation, the system is embedded above the graphical display area 103 of the computing device, in either or both landscape mode 1A and portrait mode 1B.

Figure 2:
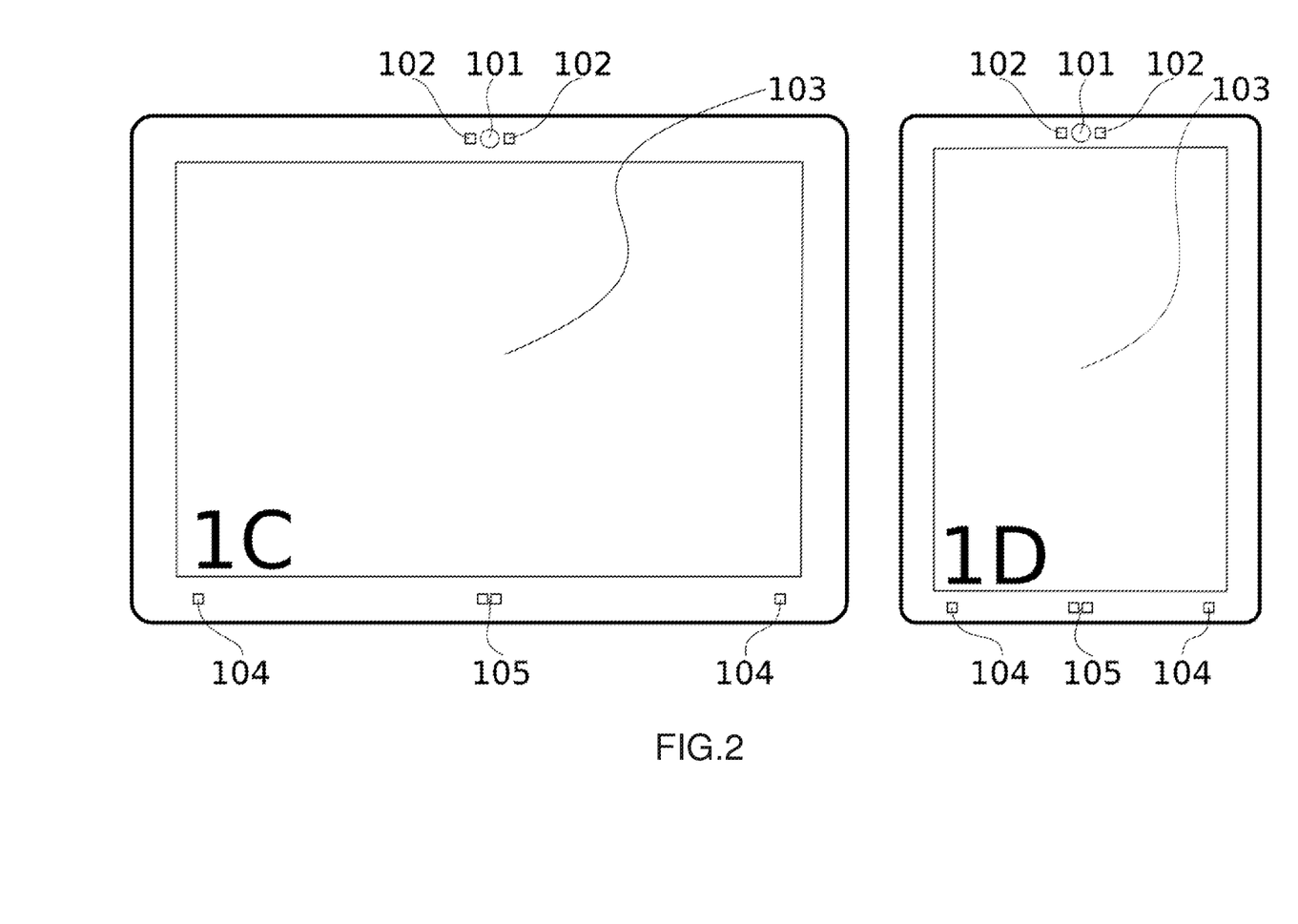
FIG. 2 illustrates another example configuration for a gaze tracking system.
Figure 6:
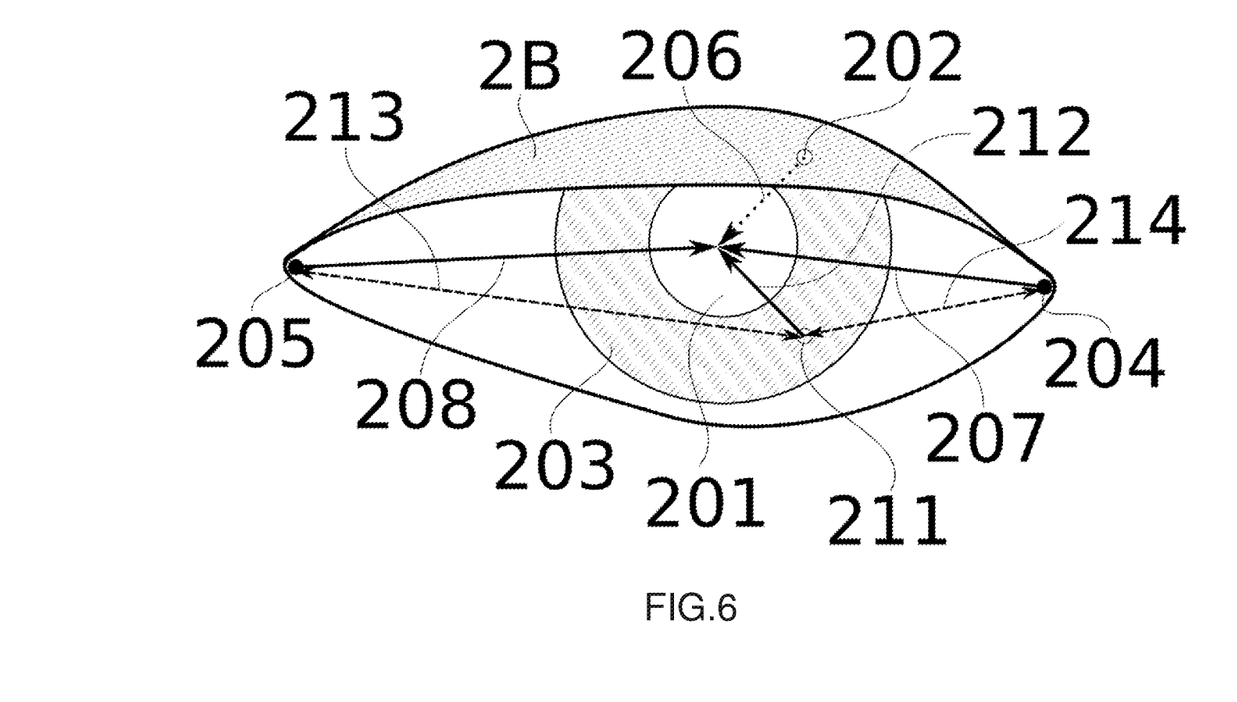
FIG. 6 illustrates the human eye, its components and features used in a dual-glint, multi-feature gaze tracking configuration.

For the embodiment of the system illustrated in FIG. 2, the following additional components are considered: symmetrical off-axis IR illumination sources 104 or centered off-axis illumination sources 105. The embodiment of the system shown in FIG. 2 can either include only sources 104 or 105, or both. In this case, the method and processing pipeline work with image data containing the eye as illustrated in FIG. 6.

Figure 3:
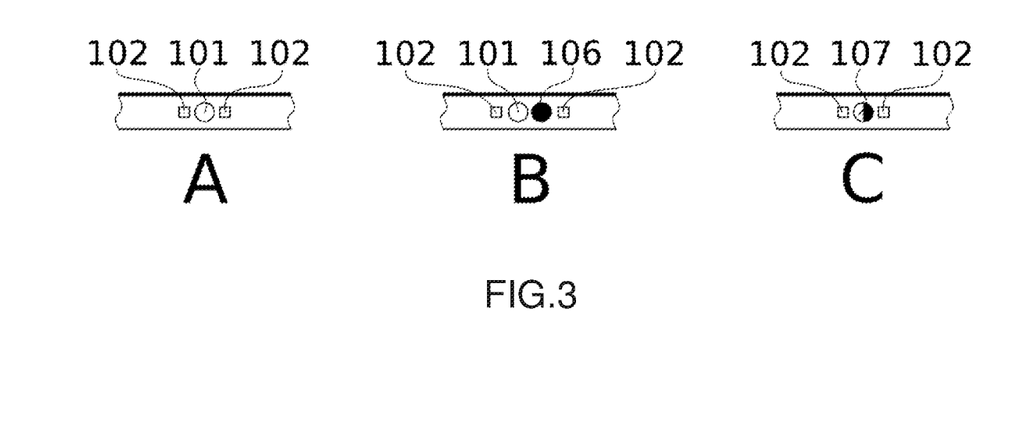
FIG. 3 illustrates components of an optical system and on-axis IR illumination sources.

FIG. 3 illustrates embodiments of the optical system coupled to the gaze tracking system: (A) the on-axis IR illuminators 102 and the IR optical system 101; (B) the on-axis IR illuminators 102 and the dual optical system version including the IR camera 101 and the visible spectrum camera 106; and (C) the on-axis IR illuminators 102 and the visible-IR camera 107.

Figure 4:
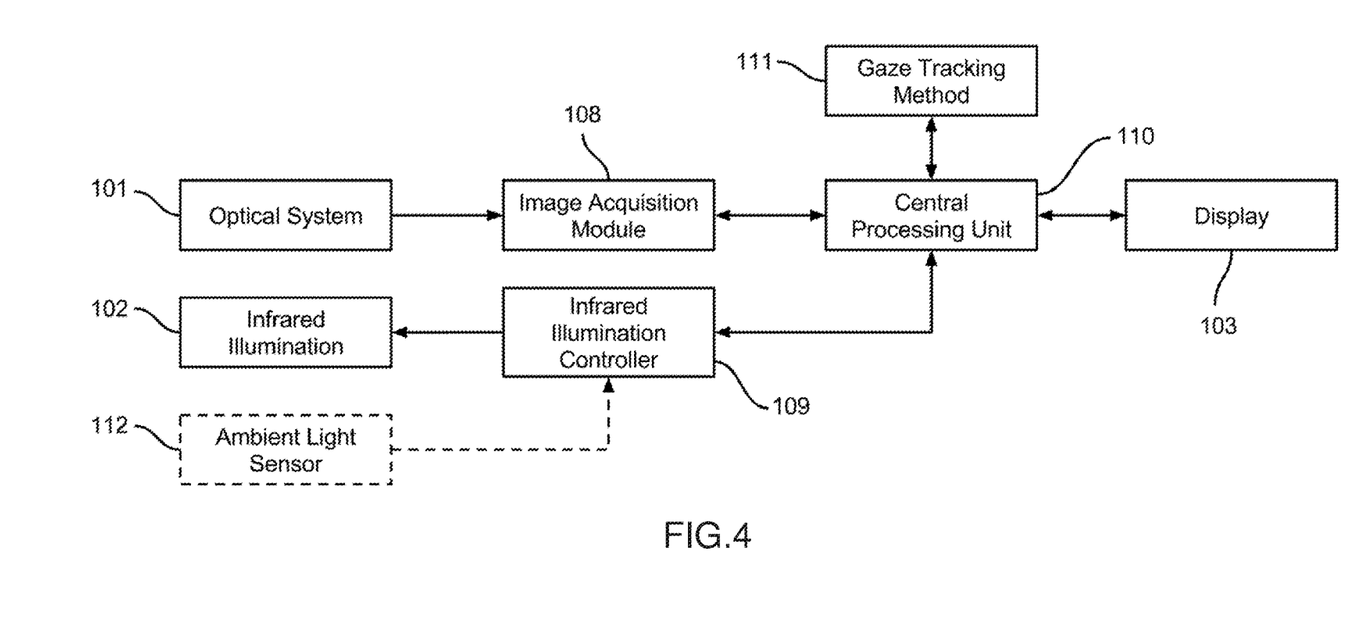
FIG. 4 illustrates an example of a configuration illustrating greater detail for the system.

The system, in its basic embodiment, illustrated in FIG. 4, comprises the following modules: the optical system 101, the IR illumination 102, an IR illumination controller 109 for controlling the infrared illumination 102, an image acquisition module 108 for acquiring images from the optical system 101, a central processing unit 110 for executing instructions for operating the system, and the graphical display 103. The gaze tracking method 111 used by the system is executed by the computing device, using any combination of its CPU 110 and/or a graphics processing unit (GPU). If an ambient light sensor 112 is included with the computing device (shown in dashed lines), this will be used to provide additional information to the infrared illumination controller 109.

Figure 5:
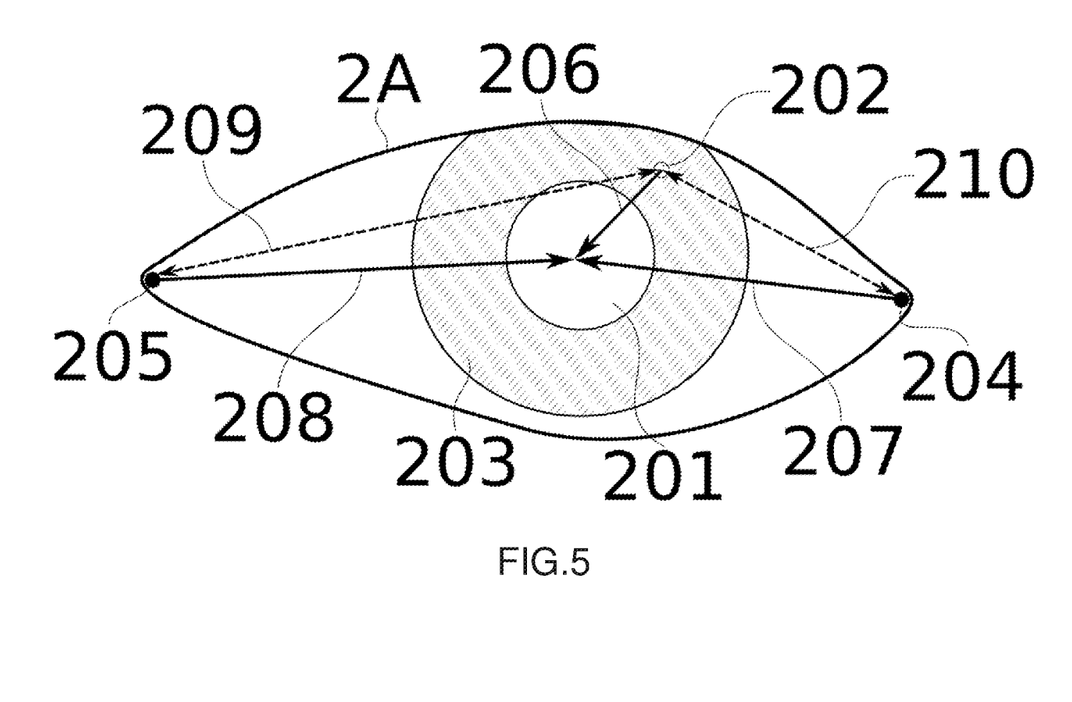
FIG. 5 illustrates the human eye, its components and features used in a single-glint, multi-feature gaze tracking configuration.

The on-axis IR illumination setup produces a single Purkinje image, corneal reflection or glint 202, as illustrated in FIG. 5. Given the positioning of the optical system 101 in relation to the graphical display area 103, the glint will appear on the upper half of the eye surface. If the eye is open such that no eyelid occlusion occurs 2A (see FIG. 5) the use of the glint in the standard Pupil Center Corneal Reflection (PCCR) gaze tracking approach is straight forward. Conversely, when eyelid occlusion happens 2B (as illustrated in FIG. 6), the glint 202 is no longer visible and the standard PCCR approach to estimate the point of gaze becomes unviable.

To overcome the absence of the glint while maintaining a continuous gaze tracking capability, the solution described herein uses a multi-feature approach for the set of reference aspects.

Figure 7:
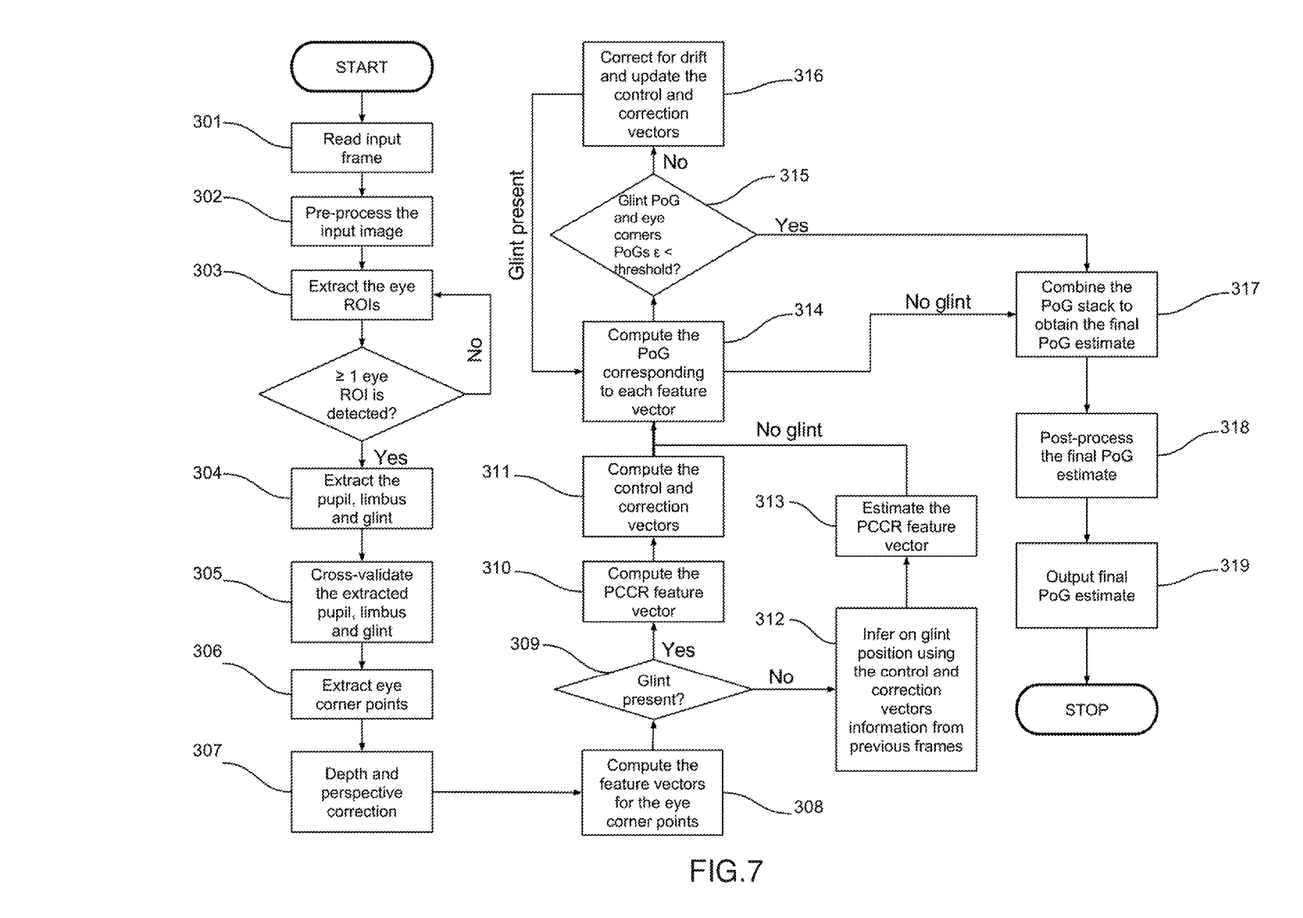
FIG. 7 is a flow chart illustrating example computer executable instructions that may be implemented in performing gaze tracking.

With respect to the method, the basic embodiment is illustrated making reference to FIG. 5. For the no-glint-occlusion case 2A, for each eye, the following primary eye components are used for the PoG estimation: bright pupil 201, iris 203 (the used gaze aspects), glint 202, nasal eye corner 204 and temporal eye corner 205 (the used reference aspects). Assuming at least one of the user's eye is present in the scene and successfully detected, the following processing steps are performed as illustrated in FIG. 7:

(a) read 301 and pre-process 302 the input frame; the pre-processing can include, but is not limited to, noise removal, blur removal, non-uniform illumination correction.

(b) initial eye detection and eye region-of-interest (ROI) extraction 303; the eye ROI extraction is deemed acceptable as long as it contains at least one gaze aspect and one reference aspect.

(c) bright pupil extraction, glint extraction and iris extraction 304;

(d) extracted eye components (pupil, glint, iris) cross-validation 305—the cross-validation process is done in order to increase the robustness of the method and to insure that the extracted gaze aspects (pupils, limbi) and reference aspects (glints) were extracted correctly. One way of performing the cross-validation is to use a virtual eye model and project the extracted eye components onto this model: if the extracted pupil is not within the extracted iris perimeter, for example, the cross-validation 305 fails and prompts the method to go back to step 304;

(e) eye corners extraction 306;

(f) depth and perspective correction 307 of the extracted gaze aspects and reference aspects; this is required in order to normalize the gaze and reference aspects. One way of performing this step is by using a normalized 3D model of the user's head and mapping the extracted aspects onto it;

(g) compute 308 the feature vectors corresponding to the eye corner points 207 and 208;

(h) if the glint 202 was detected 309, compute 310 the PCCR feature vector 206; compute 311 the two control and correction vectors, i.e., glint-nasal eye corner (GNC) 210 and glint-temporal eye corner (GTC) 209;

(i) compute the PoG estimates 314 using the pupil center nasal eye corner (PCNL) vector 207 and the pupil center temporal eye corner (PCTC) vector 208;

(j) if the error ε between the PCCR PoG and the PCNL/PCTC PoGs is higher than a predetermined threshold 315 correct 316 any drift in the detected eye corner points 204 and 205 using temporal information from previous frames (if available) and the two control and correction vectors 209 and 210;

(k) using a predefined combination scheme, combine 317 the PoG stack into a final PoG estimate;

(l) post-process 318 the final PoG estimate and output 319 the computed point of gaze. One way of post-processing the final PoG estimate is to use a precomputed noise model and correct the PoG estimate using the known noise bias.

Regarding the method illustrated in FIG. 5 and FIG. 7, for the glint-occlusion case 2B, the following additional steps are included in the main processing pipeline:

(h') if the glint 202 was not detected 309: using the last computed pair of control and correction vectors, infer 312 on the glint position under occlusion and cross-validate it with the extracted pupil and iris and estimate 313 the PCCR vector 206, either implicitly or explicitly;

(k') if the discrepancy between the virtual glint PCCR PoG estimation is above a predefined threshold value, use only the PCTC 208 and PCNL 207 PoG estimation to compute 317 the final PoG estimate. If the PCCR PoG estimation is below the threshold value, employ the same combination scheme as the one used for the 2A case.

Figure 8:
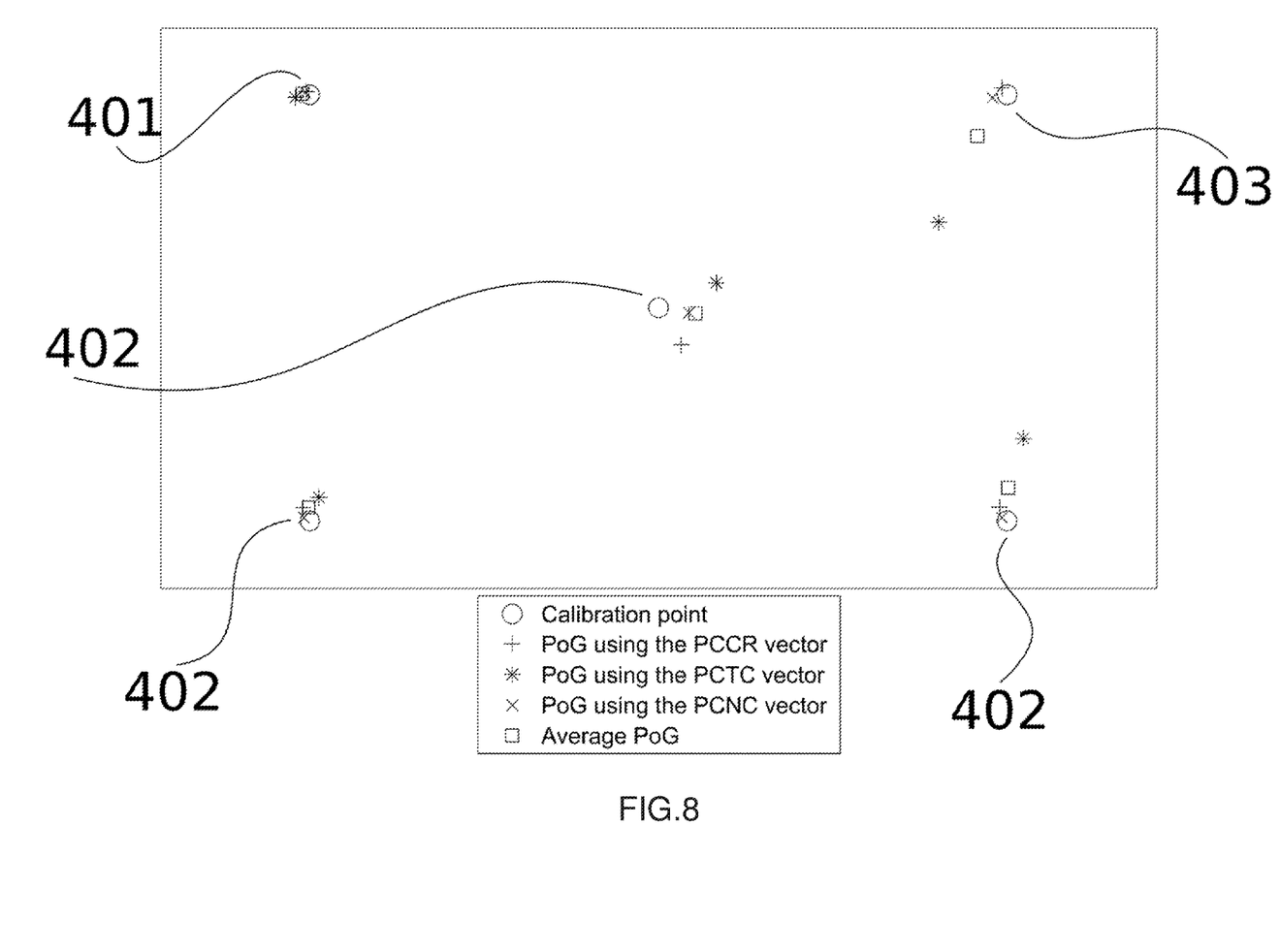
FIG. 8 illustrates an example of the PoG estimation accuracy for the multi-feature case where the eye corners are used as the complementary reference points.

An example of how the final PoG estimate is obtained from the multi-feature PoG stack in step 317 is illustrated making reference to FIG. 8. During the initial calibration process, when the points-on-screen (PoS) are known, the individual PoGs corresponding to the glint 202, temporal eye corner 205 and nasal eye corner 204 are independently computed and compared against the ground truth calibration point. For each PoG, a weight function w(ΔPoG) is computed:

$$\Delta_{PoG}^{PCCR} = \frac{PoS_{GT} - PoG_{PCCR}}{N} \quad (1)$$

$$\Delta_{PoG}^{PCTC} = \frac{PoS_{GT} - PoG_{PCTC}}{N}$$

$$\Delta_{PoG}^{PCNC} = \frac{PoS_{GT} - PoG_{PCNC}}{N}$$

where N is the normalizing quotient, and $\Delta_{PoG}$ is the error distance from the ground truth calibration point $PoS_{GT}$ to the computed point-of-gaze. N is determined as a function of the display surface size. The final point of gaze estimate is thus computed as:

$$PoG_e = \frac{w(\Delta_{PoG}^{PCCR}) * PoG_{PCCR} + w(\Delta_{PoG}^{PCTC}) * PoG_{PCTC} + w(\Delta_{PoG}^{PCNC}) * PoG_{PCNC}}{w(\Delta_{PoG}^{PCCR}) + w(\Delta_{PoG}^{PCTC}) + w(\Delta_{PoG}^{PCNC})} \quad (2)$$

Another way of combining the multi-feature PoG stack into a final $PoG_e$ is by using fixed weights chosen to reflect the expected confidence level of each individual PoG and its corresponding feature vector:

$$PoG_e = \frac{w_{PCCR} * PoG_{PCCR} + w_{PCTC} * PoG_{PCTC} + w_{PCNC} * PoG_{PCNC}}{w_{PCCR} + w_{PCTC} + w_{PCNC}} \quad (3)$$

where a choice for the fixed weights can be: $w_{PCCR}=0.5$, $w_{PCTC}=0.25$ and $w_{PCNC}=0.25$. FIG. 8 illustrates an example of the PoG accuracy of the basic embodiment, wherein the final PoG is determined as the average of the three PoGs. As it can be seen from FIG. 8, in some instances, the PoGs have similar accuracy 401, while in others the PCNC PoG exhibits a better accuracy than the PCCR PoG 402.

Yet another way of computing the final PoG estimate is by starting off with a fixed weight framework (eq. 3) and assigning the highest confidence level to $PoG_{PCCR}$. At each frame where the $PoG_{PCCR}$ can be computed, and error minimization function is also computed between $PoG_{PCCR}$ and $PoG_{PCNC}$, $PoG_{PCTC}$. Using this function, the individual weights are updated accordingly to ensure the best possible PoG estimate $PoG_e$.

Yet another way of computing the final PoG estimate is using a hidden Markov model, where the individual PoG estimates are assumed to be random variables, part of a Markov process and no predefined confidence levels are given to any of the individual estimates. The final PoG estimate is thus obtained as an output probability.

Yet another way of computing the final PoG estimate is by using an artificial neural network approach, where the individual PoG estimates are the inputs of the network while the final PoG estimate is the output.

Yet another way of computing the final PoG estimate is by using a multivariate adaptive regression splines approach, where the individual PoG estimates form the input variable space while the final PoG estimate is the output.

For step 312 of the basic embodiment, when the glint 202 is not present and the PCCR feature vector 206 cannot be computed, the glint is inferred. One way of inferring the glint 202 position is by using a particle filter. Another way of doing this is to use the control and correction vectors 209 and 210 as supporters for the glint 202 feature. The latter solution is in line with the framework of tracking invisible features [14].

Figure 9:
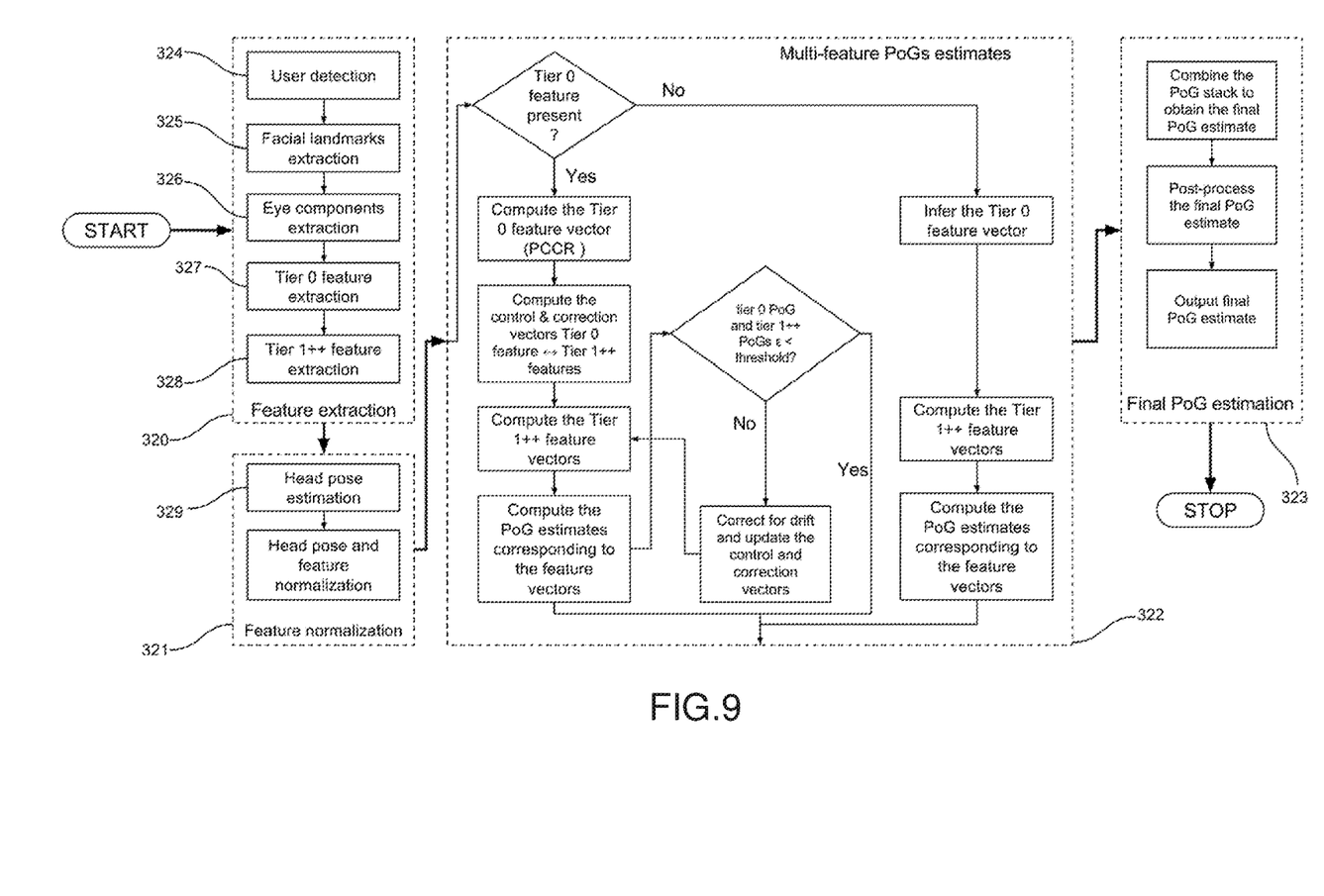
FIG. 9 is a flow chart illustrating example computer executable instructions that may be implemented in performing gaze tracking.

In other embodiments, the method can include extracting additional reference aspects, as illustrated in FIG. 9. The main functional blocks of the method include:
(1) the feature extraction 320 process;
(2) the feature normalization 321 process;
(3) multi-feature PoG estimation 322; and
(4) final PoG estimation 323.

Figure 10:
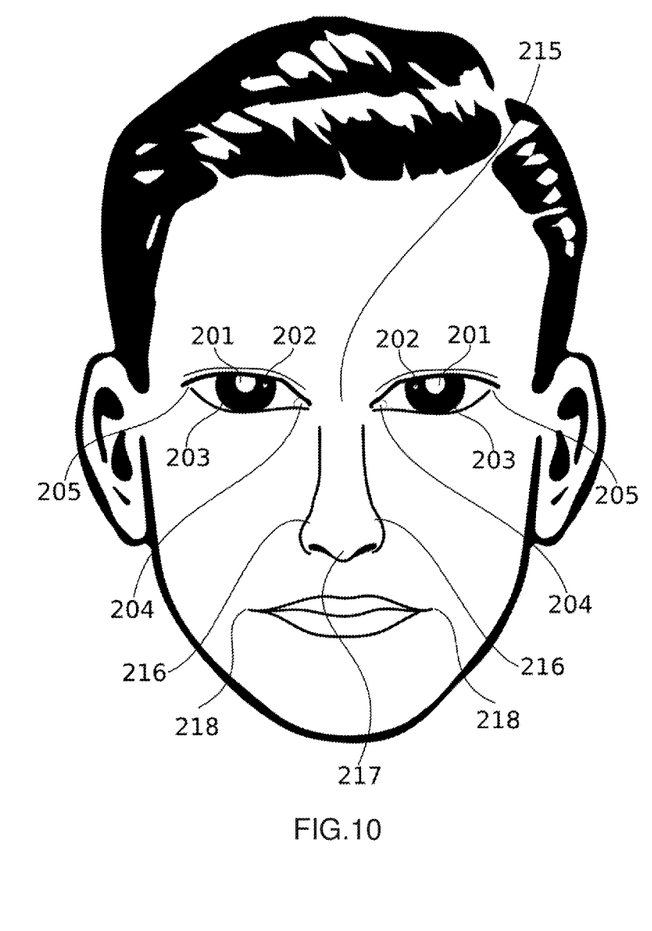
FIG. 10 illustrates an example of reference points that can be used for multi-feature gaze tracking.

The general embodiment of the method includes the following steps:
(1.1) initial user detection 324;
(1.2) reference aspects extraction 325, including, but not limited to, the glabella midpoint 215, the ala nasi points 216, the apex of the nose 217 or the labial commissures of mouth 218 (as illustrated in FIG. 10);
(1.3) eye components extraction 326, including, but not limited to, pupil 201, limbus 203 (gaze aspects), glint 202, eye corners 204 and 205 (reference aspects), as illustrated in FIG. 10;
(1.4) Tier 0 feature extraction 327 refers to the glint 202 (or 211) eye components;
(1.5) Tier 1++ feature extraction 328, refers to the reference aspects extracted in step 325;
(2) feature normalization 321 includes the estimation of the head pose 329 based on the extracted facial landmarks in step 325 and the normalization of the features extracted in steps 327 and 328. This includes mapping the features from the 3-D facial space to the 2-D gaze mapping space and correcting for pose rotation and translation. Subsequent steps are analogous to the basic embodiment of the method described above.

REFERENCES

[1] J. Merchant, R. Morrissette, and J. L. Porterfield. Remote measurement of eye direction allowing subject motion over one cubic foot of space. *IEEE Transactions on Biomedical Engineering*, BME-21(4):309-317, July 1974.

[2] C. Morimoto, M. Flickner, A. Amir, and D. Koons. Pupil detection and tracking using multiple light sources. Technical Report RJ 10117, IBM US Research Centers (Yorktown, San Jose, Almaden, US), Yorktown Heights, 1998.

[3] J. Elvesjö, M. Skogö, and G. Elvers. Method and installation for detecting and following an eye and the gaze direction thereof. https://www.google.com.tr/patents/U.S. Pat. No. 7,572,008, August 2009. U.S. Pat. No. 7,572,008.

[4] P. Blixt, A. Hoglund, G. Troili, J. Elvesjö, and M. Skogö. Adaptive camera and illuminator eyetracker. https://www.google.com.tr/patents/U.S. Pat. No. 8,339,446, December 2012. U.S. Pat. No. 8,339,446.

[5] G. Longhurst and S. Rougeaux. Eye tracking system and method. https://www.google.com.tr/patents/U.S. Pat. No. 7,653,213, January 2010. U.S. Pat. No. 7,653,213.

[6] S. M. Chao. Eye-tracking method and system for implementing the same. https://www.google.com.tr/patents/U.S. Pat. No. 7,832,866, November 2010. U.S. Pat. No. 7,832,866.

[7] S. M. Chao. Eye-tracking method and eye-tracking system for implementing the same. https://www.google.com.tr/patents/U.S. Pat. No. 8,135,173, March 2012. U.S. Pat. No. 8,135,173.

[8] Y. Ebisawa. Improved video-based eye-gaze detection method. *IEEE Transactions on Instrumentation and Measurement*, 47(4):948-955, August 1998.

[9] Q. Ji and X. Yang. Real-time eye, gaze, and face pose tracking for monitoring driver vigilance. *Real-Time Imaging*, 8(5):357-377, 2002.

[10] T. Ohno, N. Mukawa, and A. Yoshikawa. FreeGaze: A Gaze Tracking System for Everyday Gaze Interaction. In *Proceedings of the 2002 Symposium on Eye Tracking Research & Applications*, ETRA '02, pages 125-132, 2002.

[11] L. Sesma, A. Villanueva, and R. Cabeza. Evaluation of pupil center-eye corner vector for gaze estimation using a web cam. In *Proceedings of the symposium on eye tracking research and applications*, pages 217-220, 2012.

[12] Y. J. Liang and Y. L. Tang. Eye-controlled computer. https://www.google.com.tr/patents/USD722315, February 2015. U.S. Pat. D722,315.

[13] N. J. Sullivan. System and method for on-axis eye gaze tracking. https://www.google.ca/patents/WO2014146199A1?cl=en, September 2014. WO Patent App. PCT/CA2014/050,282.

[14] H. Grabner, J. Matas, L. Van Gool, and P. Cattin. Tracking the invisible: Learning where the object might be. In *IEEE Conference on Computer Vision and Pattern Recognition*, CVPR '10, pages 1285-1292, June 2010.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems and/or devices described herein, any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for determining a point of gaze directed at a graphical display, the method comprising:
   a) acquiring an image of at least one eye of a user containing, for each eye, at least three image aspects, with at least one gaze aspect and at least one reference aspect, and performing for each eye in the image:
   b) extracting the image aspects from the image, the image aspects comprising a set of reference aspects and a set of gaze aspects corresponding to the image;
   c) extracting a set of features for each of said image aspects;
   d) computing a set of feature vectors between said set of gaze aspects and said set of reference aspects, wherein each said feature vector describes a relationship between one or more features of a gaze aspect and one or more features of a reference aspect;
   e) computing a point of gaze for each of said set of feature vectors, using a predefined mathematical relationship or model; and
   f) using another predefined mathematical relationship or model to combine the computed points of gaze into a final point of gaze on the graphical display.

2. The method of claim 1 wherein said image comprises image aspects belonging to an image space, said image aspects comprising said set of reference aspects and said set of gaze aspects; and wherein said set of gaze aspects comprise one or more of: a pupil and an iris.

3. The method of claim 1, wherein said set of reference aspects comprise one or more of: an on-axis glint, an off-axis glint, at least one eye corner, a glabella midpoint, ala nasi points, an apex of a nose of the user, a labial commissures of mouth, and any combination of reference aspects extractable from said image.

4. The method of claim 1, wherein said set of features comprises one or more of: a centroid, area, radius, or perimeter of said image aspects.

5. The method of claim 1, wherein said feature vectors are combined into a single feature vector and said single feature vector is used to compute the final point of gaze using said predefined mathematical relationship or model.

6. The method of claim 1, wherein said feature vectors are corrected for pose variance using another mathematical relationship or model.

7. The method of claim 6, wherein defining said other mathematical relationship or model includes determining the cornea position in space relative to an image coordinate system; and wherein said other mathematical relationship or model includes at least one of: spherical transformations, perspective transformations, and polynomial interpolation.

8. The method of claim 1, wherein said acquiring is performed by at least one illumination source, and at least one camera focusing upon at least one eye of said user, each camera having a focal center, and an image plane defining said image coordinate system.

9. The method of claim 1, wherein said predefined mathematical relationship or model includes at least one of: spherical transformations, perspective transformations, and polynomial interpolation.

10. The method of claim 9, wherein said predefined mathematical relationship is estimated via a calibration procedure, comprising:
    a) displaying a set of predefined points in space to the user;
    b) computing and storing associated normalized image aspects to said set of predefined points; and
    c) performing a numerical fitting procedure to determine the predefined mathematical relationship between said normalized image aspects to associated ones of said set of predefined points.

11. The method of claim 10, wherein said reference aspects further comprise: a glabella midpoint, ala nasi points, an apex of a nose of the user, and labial commissures of mouth;
    wherein additional reference aspects are obtained by averaging physical reference aspects to produce a virtual reference aspect, comprising one or more of:
    a) a centroid of eye corners;
    b) a centroid of the ala nasi points, or the labial commissures of mouth;
    c) a centroid of all extracted facial landmarks; and
    d) a centroid of a face or head of the user.

12. The method of claim 11, wherein said reference aspects further comprise a corneal reflection resulting from off-axis infrared illumination.

13. The method of claim 11 further comprising:
    a) applying a control method for switching between on-axis and off-axis illuminators when the corneal reflection provided by on-axis illumination is not detectable;
    b) pre-processing the image for an off-axis illumination case to maintain a bright pupil response.

14. The method of claim 13, wherein said reference aspects are used to normalize a head pose of the user to account for head rotation and/or translation; and
    wherein said reference aspects are used to:
    a) compute the feature vectors corresponding to the reference aspects and a pupil center;
    b) compute for each feature vector a corresponding point of gaze and combine all points of gaze into a final point of gaze estimation; and
    c) post-process the final point of gaze estimation.

15. The method of claim 14, wherein said reference aspects are used to:
    a) compute the feature vectors corresponding to the reference aspects and a pupil center;
    b) combine said feature vectors into a single feature vector and compute a corresponding point of gaze as a final point of gaze estimation; and
    c) post-process the final point of gaze estimation.

16. The method of claim 1, wherein said reference aspects comprise any one or more of: a corneal reflection resulting from on-axis infrared illumination, eye corners of each eye, and any additional reference aspects that can be obtained by combining on-axis glint and eye corners.

17. The method of claim 16, wherein said reference aspects further comprise a corneal reflection resulting from off-axis infrared illumination.

18. The method of claim 1 wherein if a pupil cannot be extracted due to occlusion, a limbus is used as a replacement.

19. The method of claim 1, wherein an image acquisition module used to acquire said image comprises a single camera system able to acquire both visible and infrared spectrum images, the method further comprising:
    a) performing visible-infrared demosaicing pre-processing to separate visible and infrared image data while maintaining the native imaging sensor resolution; and
    b) extracting the reference aspects and a pupil center from image data belonging to one or both spectra.

20. The method of claim 1, wherein an image acquisition module used to acquire said image comprises a dual-camera system, the dual-camera system comprising an infrared camera and a visible spectrum camera, the method further comprising:
    a) performing depth estimation based on a stereo camera paradigm; and
    b) extracting the reference aspects and a pupil center from image data provided by one or both cameras.

21. The method of claim 1 further comprising controlling and managing multiple displays.

22. A system adapted to be coupled to at least one image acquisition module and a graphical display, comprising:
    a) an interface for acquiring at least one image of at least one eye of a user captured by the image acquisition module while the user is gazing at the graphical display and while at least one illumination source is emitting light towards the at least one eye of the user;
    b) an illumination controller for controlling said at least one illumination source; and
    c) a processor configured for performing at least one of power and data management, the processor further configured for performing the method of claim 1.

23. The system of claim 22, wherein said system is embedded in at least one of the following devices: a laptop, an all-in-one computer, a desktop computer, a tablet computer, and a smartphone; and
    wherein said system uses an ambient light sensor and the ambient light sensor is used to control IR illumination output.

24. The system of claim 22, wherein said system is embodied as an independent apparatus.

25. The system of claim 22, wherein the image acquisition module comprises a dual-camera system, the dual-camera system comprising an infrared camera and a visible spectrum camera.

26. The system of claim 22, wherein the image acquisition module comprises a single camera system able to acquire both visible and infrared spectrum images.

27. A non-transitory computer readable medium comprising computer executable instructions for determining a point of gaze directed at a graphical display, the instructions comprising instructions for:
   a) acquiring an image of at least one eye of a user containing, for each eye, at least three image aspects, with at least one gaze aspect and at least one reference aspect, and performing for each eye in the image:
   b) extracting the image aspects from the image, the image aspects comprising a set of reference aspects and a set of gaze aspects corresponding to the image;
   c) extracting a set of features for each of said image aspects;
   d) computing a set of feature vectors between said set of gaze aspects and said set of reference aspects, wherein each said feature vector describes a relationship between one or more features of a gaze aspect and one or more features of a reference aspect;
   e) computing a point of gaze for each of said set of feature vectors, using a predefined mathematical relationship or model; and
   f) using another predefined mathematical relationship or model to combine the computed points of gaze into a final point of gaze on the graphical display.

28. A system comprising a processor and memory, the memory comprising computer executable instructions for determining a point of gaze directed at a graphical display, the instructions comprising instructions for:
   a) acquiring an image of at least one eye of a user containing, for each eye, at least three image aspects, with at least one gaze aspect and at least one reference aspect, and performing for each eye in the image:
   b) extracting the image aspects from the image, the image aspects comprising a set of reference aspects and a set of gaze aspects corresponding to the image;
   c) extracting a set of features for each of said image aspects;
   d) computing a set of feature vectors between said set of gaze aspects and said set of reference aspects, wherein each said feature vector describes a relationship between one or more features of a gaze aspect and one or more features of a reference aspect;
   e) computing a point of gaze for each of said set of feature vectors, using a predefined mathematical relationship or model; and
   f) using another predefined mathematical relationship or model to combine the computed points of gaze into a final point of gaze on the graphical display.

\* \* \* \* \*